(12) United States Patent
Lin (10) Patent No.: US 7,377,197 B1
(45) Date of Patent: May 27, 2008

(54) HIGH-SPEED TIRE REPAIR TOOL

(76) Inventor: Kun-Shan Lin, No. 247, Chung-Shan Rd., Su-Au Cheng, Yi-Lan Shien (TW)

( * ) Notice: Subject to any disclaimer, the term of this patent is extended or adjusted under 35 U.S.C. 154(b) by 20 days.

(21) Appl. No.: 11/592,233

(22) Filed: Nov. 3, 2006

(51) Int. Cl.
*B29C 73/08* (2006.01)
*B29C 73/00* (2006.01)

(52) U.S. Cl. ........................................ 81/15.7; 152/370

(58) Field of Classification Search ................. 81/15.7, 81/15.2; 152/370
See application file for complete search history.

(56) References Cited

U.S. PATENT DOCUMENTS 3,052,141 A * 9/1962 Mitchell ..................... 81/15.7
3,083,597 A * 4/1963 Best ........................... 81/15.7
3,250,156 A * 5/1966 Best ........................... 81/15.7
5,515,751 A * 5/1996 Lee ............................. 81/15.7
7,051,622 B1 * 5/2006 Chen ........................... 81/15.7

* cited by examiner

*Primary Examiner*—David B Thomas
(74) *Attorney, Agent, or Firm*—Troxell Law Office, PLLC (57) ABSTRACT

A high-speed tire repair tool includes a locating unit having an outer tube and a locating bar; a buffer element having a head and an inner tube connected to the head and received in the outer tube with the locating bar fixed to the inner tube at a predetermined position; a hollow pipe mounted in the outer tube, the inner tube, and the head; and a hole plugging assembly mounted to the head and connected to the hollow pipe, and having an abrasive element and a plugging strip. When the hollow pipe is driven to rotate and the outer tube is moved forward by a driving unit, the hole plugging assembly connected to a front end of the hollow pipe is quickly driven into a hole on a high-speed tire for the abrasive element to trim the hole and the plugging strip to air-tightly plug the hole.

7 Claims, 7 Drawing Sheets

HIGH-SPEED TIRE REPAIR TOOL

FIELD OF THE INVENTION

The present invention relates to a high-speed tire repair tool, and more particularly to a high-speed tire repair tool that uses a driving unit to quickly drive a hole plugging assembly into a hole on a tire to plug the hole and thereby effectively prevents air from leaking out of the tire via the hole.

BACKGROUND OF THE INVENTION

Figure 1:
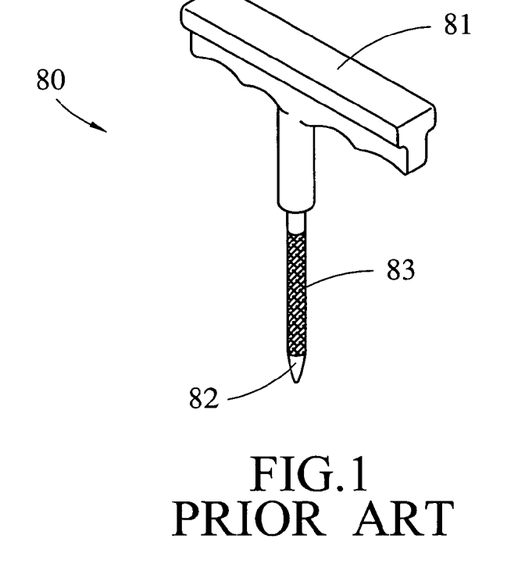
FIGS. 1 and 2 are perspective views of two conventional high-speed tire repair tools.
Figure 2:
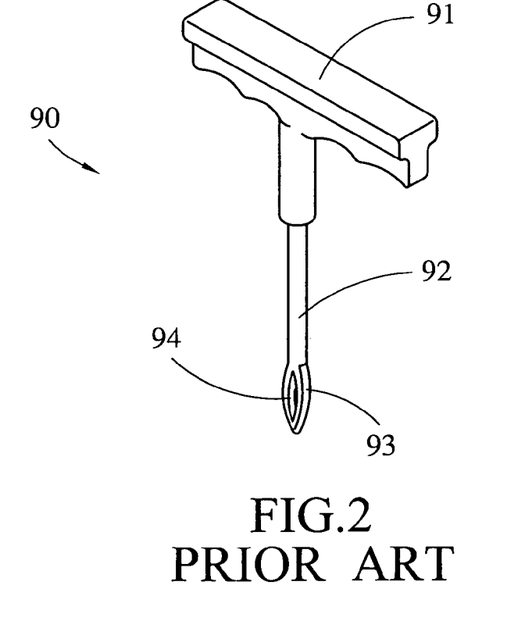

When a high-speed tire has a hole, two tools are generally needed to plug the hole. One of the two tools is an abrasive tool 80, and the other one is an inserting tool 90. As shown in FIG. 1, the abrasive tool 80 includes a first handle 81 and a first inserting stem 82 having a toothed outer surface 83; and as shown in FIG. 2, the inserting tool 90 includes a second handle 91 and a second inserting stem 92 having a pointed end 93 formed of a hole 94. To repair the tire, first rotate while drive the first inserting stem 82 of the abrasive tool 80 into the hole on the high-speed tire; use the toothed surface 83 of the first inserting stem 82 to trim an inner wall surface of the hole; and then pull out the first inserting stem 82. Thereafter, insert a rubber strip (not shown) in the hole 94 on the insertion tool 90; apply glue over the rubber strip; rapidly insert the insertion tool 90 along with the rubber strip into the hole; and immediately jerk back the insertion tool 90 with one swift move. When the insertion tool 90 is pulled out of the hole, the rubber strip is left in and adheres to the hole. The rubber strip and the glue stuff and accordingly, plug the hole to ensure that air does not leak from the tire when the tire is inflated.

A general user might be able to use the above-mentioned tire repair tools 80, 90 to easily repair a high-speed tire for a motorcycle. However, in the case of a high-speed tire for a car, it would be laborious to repair the tire with the two repair tools 80, 90 because the car tire has a relatively large thickness, compared to the motorcycle tire.

SUMMARY OF THE INVENTION

A primary object of the present invention is to provide a labor-saving and efficient tire repair tool for high-speed tire.

Another object of the present invention is to provide a high-speed tire repair tool that may be used to plug holes on tires of different tire thickness.

To achieve the above and other objects, the high-speed tire repair tool according to the present invention includes a locating unit having an outer tube provided with a first and a second long slot of different length, and a locating bar extended through and projected from one of the two long slots; a buffer element having a head and an inner tube connected at a front end to a rear end surface of the head, a rear portion of the inner tube being rearward projected from the head to slidably received in the outer tube, and the locating bar being fixed at an inner end to the inner tube at a predetermined position, so that the outer tube is guided by the locating bar and the inner tube to axially slide toward or away from the head by a predetermined distance defined by one of the long slots; a hollow pipe rotatably mounted in the outer tube, the inner tube, and the head; and a hole plugging assembly having an abrasive element and a plugging strip, and the abrasive element having a front end and a rear end connected to the plugging strip.

The hole plugging assembly is mounted to the head and connected to a front end of the hollow pipe. When a driving unit produces a sufficient driving force to drive the hollow pipe to rotate and the outer tube to move toward the head, the hole plugging assembly connected to the front end of the hollow pipe is quickly driven into a hole on the high-speed tire for the abrasive element to trim the hole and the plugging strip to air-tightly plug the hole, so that the hole is sealed to prevent air leakage.

In the present invention, the locating bar of the locating unit may be adjusted to a different long slot to change the distance by which the outer tube is moved toward the head, and accordingly, the depth by which the hole plugging assembly is driven into a tire, so that the hole plugging assembly may be used to repair tires of different thickness.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 3:
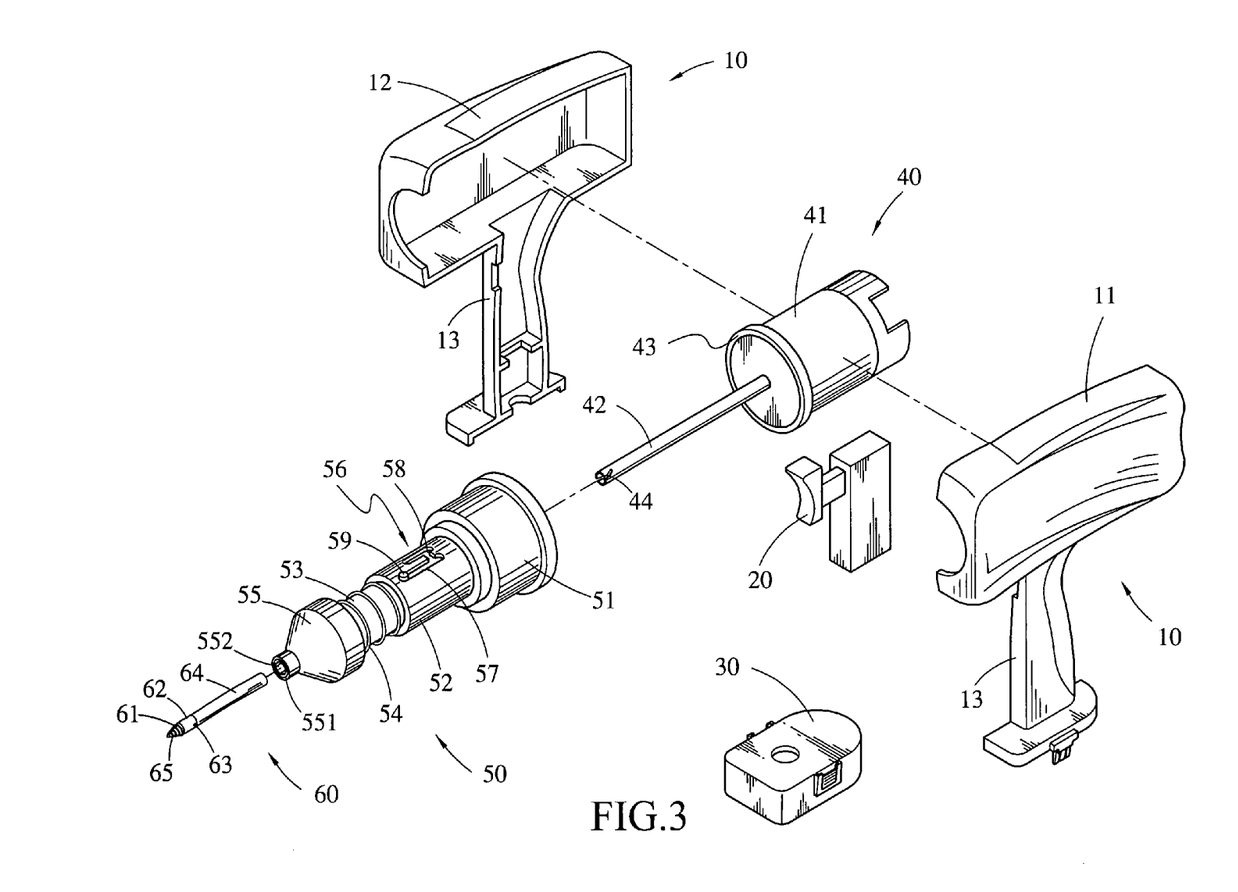
FIG. 3 is an exploded perspective view of a high-speed tire repair tool according to a preferred embodiment of the present invention.
Figure 4:
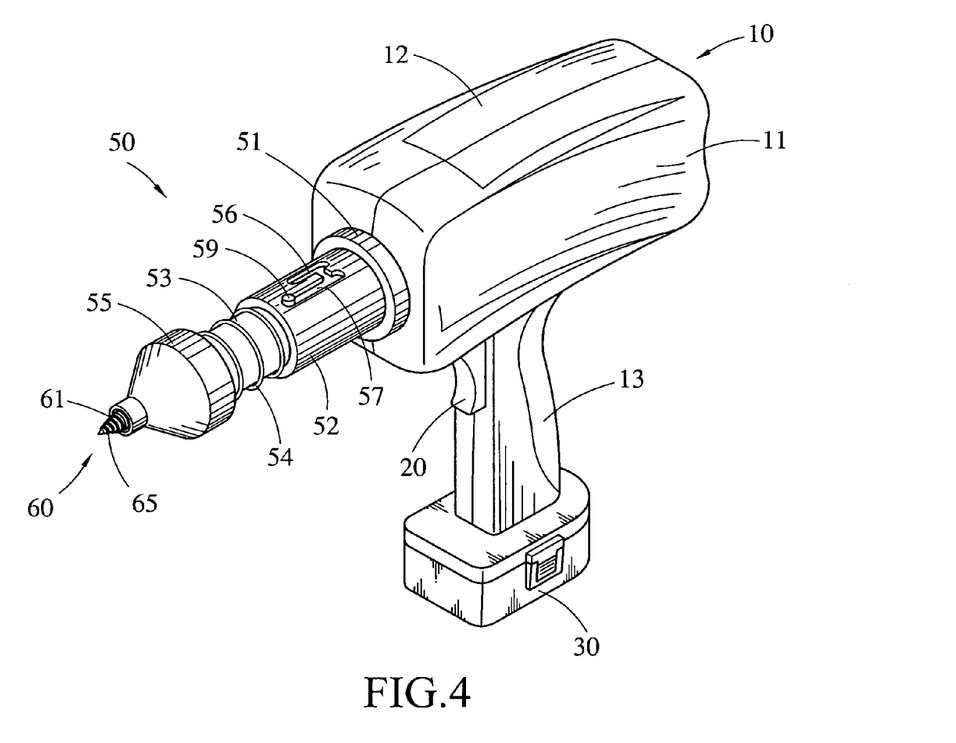
FIG. 4 is an assembled view of FIG. 3.

Please refer to FIGS. 3 and 4 that are exploded and assembled perspective views, respectively, of a high-speed tire repair tool according to a preferred embodiment of the present invention. As shown, the high-speed tire repair tool of the present invention includes a housing 10, a switch 20, a power-supply element 30, a driving unit 40, a buffer element 50, a locating unit 56, and a hole plugging assembly 60.

The housing 10 is assembled from a first case 11 and a second case 12, and has a vertically downward extended portion to form a handle 13. The switch 20 and the power-supply element 30, such as a battery or other functionally equivalent element, are mounted in a space defined in the handle 13.

The driving unit 40 is mounted in a space defined in the housing 10 above the handle 13 to electrically connect to the switch 20 and the power-supply element 30, and includes a motor 41, a rotatable hollow pipe 42 forward extended from the motor 41, and a collar 43 formed around a front end of the motor 41. The hollow tube 42 is provided at a front end with an L-shaped open slot 44.

The buffer element 50 includes an inner tube 53, a spring 54, and a head 55. The inner tube 53 has a front end connected to a rear end surface of the head 55 with a rear end of the inner tube 53 rearward projected from the head 55. The spring 54 is mounted around the inner tube 53.

The locating unit 56 includes an expanded annular section 51, an outer tube 52, a first long slot 57, a second long slot 58, and a locating bar 59. The expanded annular section 51 is made of a polyethylene (PE) material for coupling at a rear end to the collar 43 at the front end of the motor 41, and at a front end to the outer tube 52, so that the outer tube 52 may be driven by the motor 41 to axially slide outside the inner tube 53 toward or away from the head 55 by a predetermined distance. The locating bar 59 is fixed at an inner end to the inner tube 53 with an outer end upward extended through the first long slot 57 to partially project from the outer tube 52. The first and the second long slot 57, 58 are parallel to and communicable with each other, such that the locating bar 59 may be axially moved in the first or the second long slot 57, 58 to define two predetermined distances within which the outer tube 52 may be axially slid. In the illustrated preferred embodiment, the first long slot 57 is longer than the second long slot 58.

The spring 54 may stretch or be compressed between the head 55 and a front end of the outer tube 52. When the outer tube 52 is axially slid toward the head 55, the spring 54 provides a buffer effect, preventing the outer tube 52 from colliding with the head 55. The head 55 is configured as a funnel having a front narrow opening 551, in which a bearing 552 is mounted. The hollow pipe 42 is extended from the motor 41 through the outer tube 52, the inner tube 53, and an inner space of the head 55.

Figure 5:
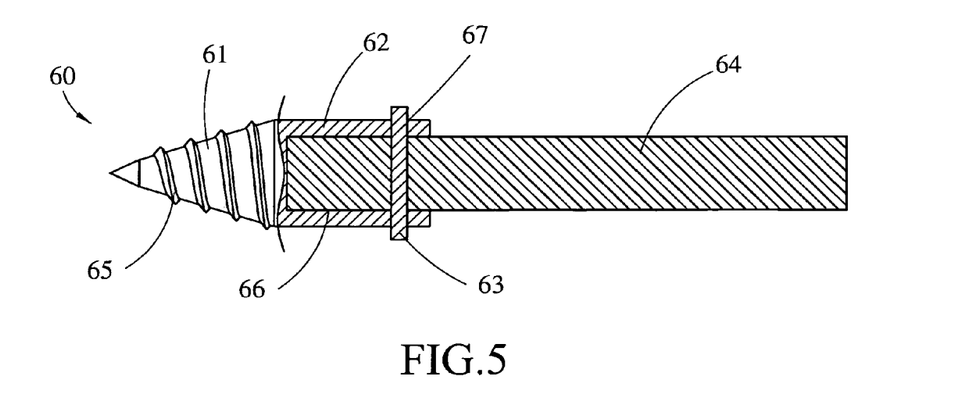
FIG. 5 is a sectioned side view of a hole plugging assembly included in the high-speed tire repair tool of the present invention.

Please refer to FIGS. 3 and 5 at the same time. The hole plugging assembly 60 includes an abrasive element 61, a pin 63, and a plugging strip 64, such as a rubber strip. The abrasive element 61 includes a tapered front end with a screw thread 65 formed on an outer surface thereof, and a rear end in the form of an extended tube 62 defining a cavity 66 and provided with a plurality of through holes 67. The plugging strip 64 has a front end inserted in the cavity 66 and is held thereto by inserting the pin 63 into the through holes 67. When the hole plugging assembly 60 is mounted to the front opening 551 of the head 55, the pin 63 having two ends projected from the abrasive element 61 passes through the bearing 552 into the front opening 551 to be held to the L-shaped open slot 44 at the front end of the hollow pipe 42, so as to connect the hole plugging assembly 60 to the hollow pipe 42. The abrasive element 61 is used to trim an inner surface of a hole on a tire. The plugging strip 64 is adapted to air-tightly plug the hole on the tire to prevent air from leaking out of the tire via the hole.

Figure 6:
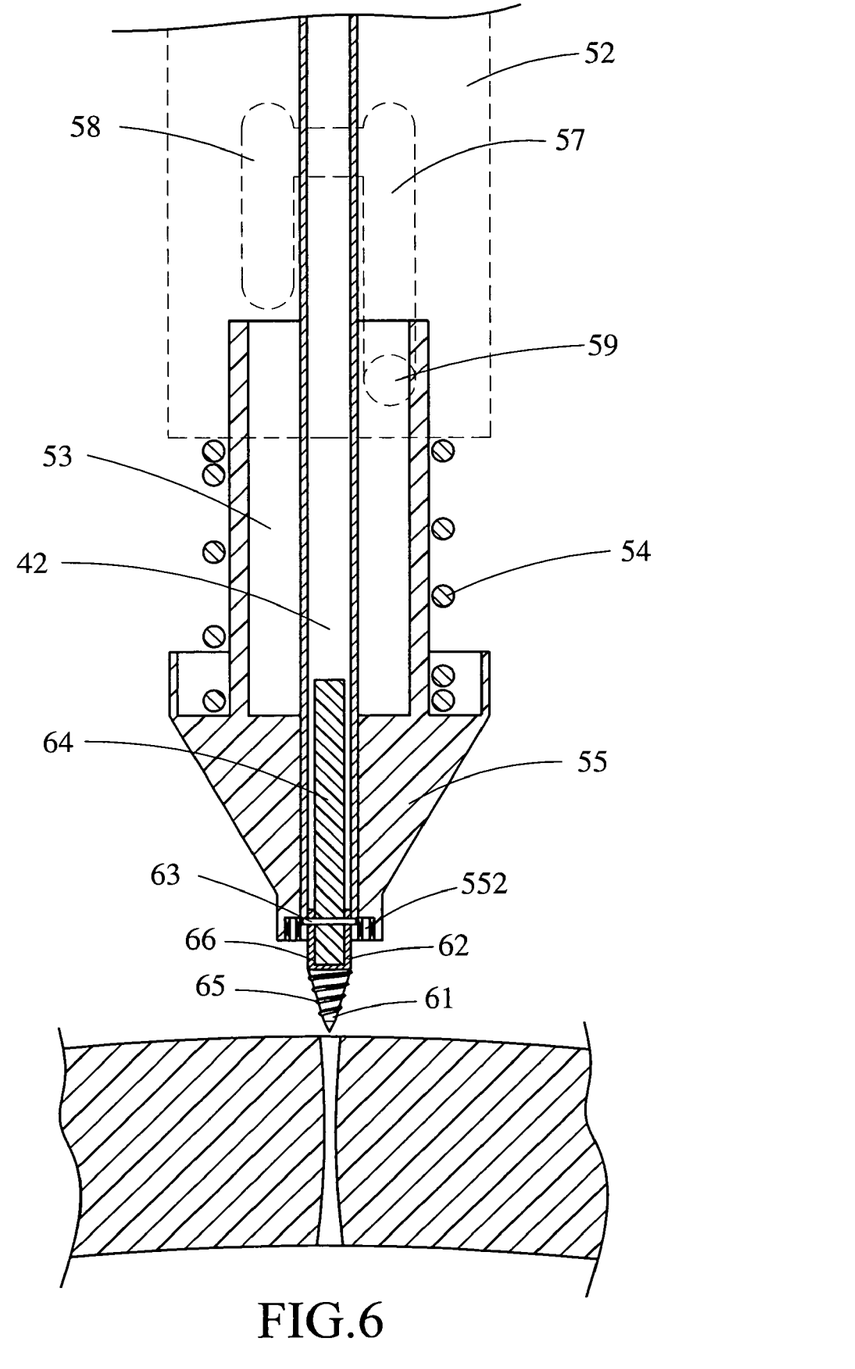
FIG. 6 is a sectional view showing the hole plugging assembly of the present invention is about to enter a hole on a tire.

Please refer to FIG. 6. To repair the tire, the hole plugging assembly 60 is mounted to the head 55, so that the abrasive element 61 is ready for rapidly entering the hole on the high-speed tire. At this point, the locating bar 59 is located in the first long slot 57 at a front end or beginning thereof.

Figure 7:
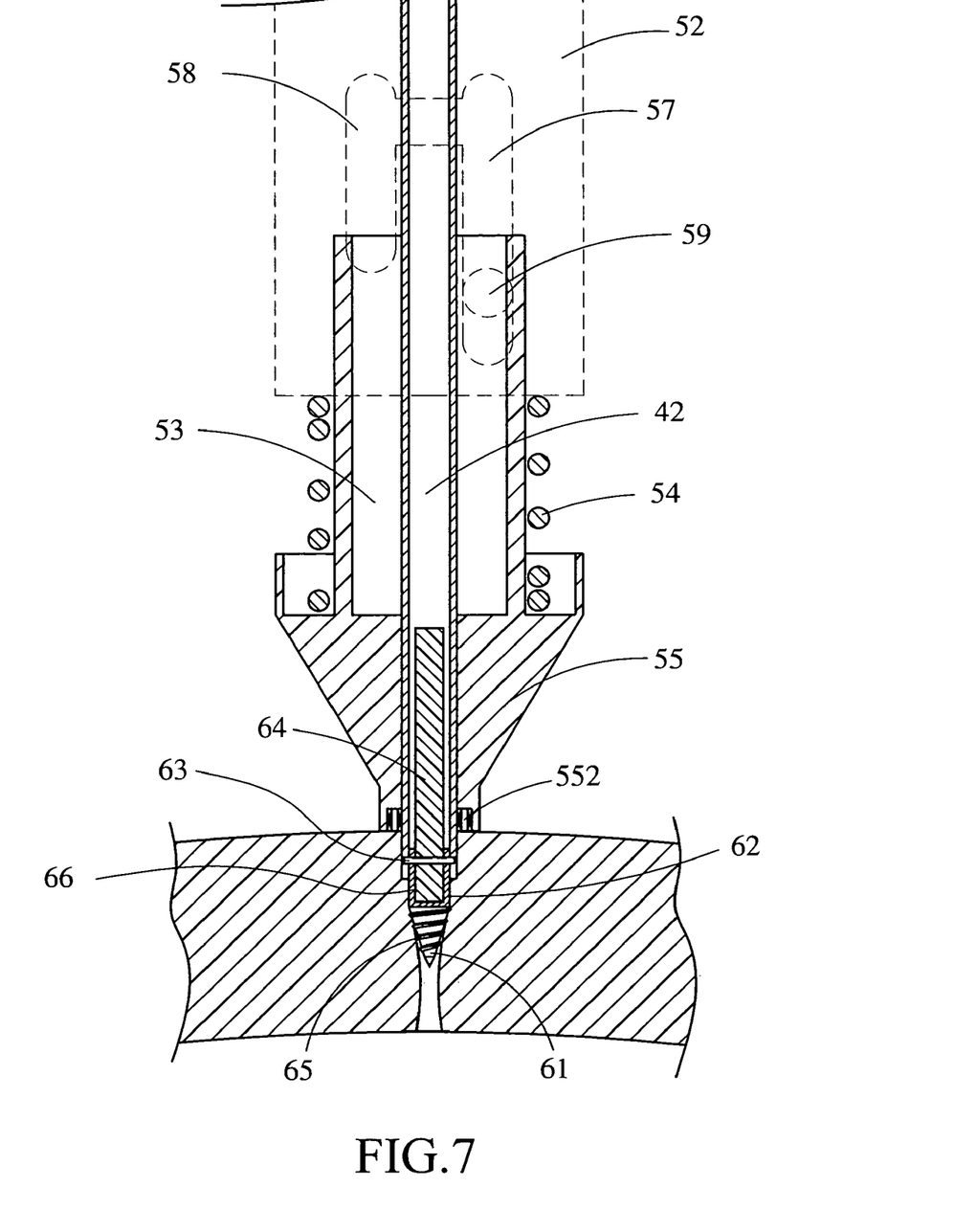
FIG. 7 is a sectional view showing the hole plugging assembly of the present invention has entered the hole on the tire.

As shown in FIG. 7, when the switch 20 is turned on, power is supplied from the power-supply element 30 to the motor 41, so that the motor 41 is actuated to produce a driving force for driving the outer tube 52 to slide toward the head 55 while causing the hollow pipe 42 to rotate and move forward, bringing the hole plugging assembly 60 to enter the hole on the high-speed tire. At this point, the screw thread 65 on the abrasive element 61 trims the hole. When the outer tube 52 slides forward, the spring 54 is compressed, and the inner tube 53 is gradually received in the outer tube 52 to accordingly displace the locating bar 59 in the first long slot 57.

Figure 8:
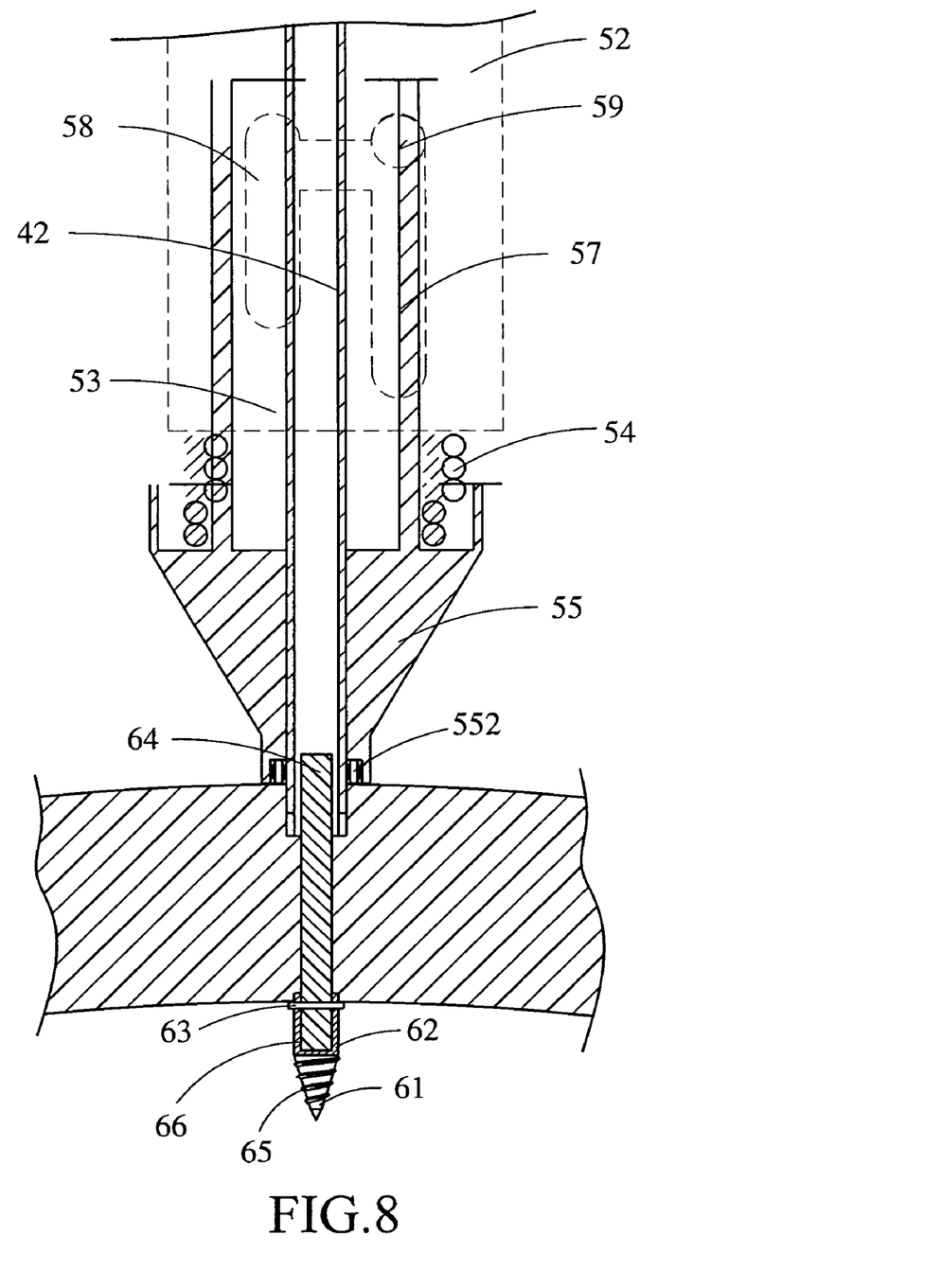
FIG. 8 is a sectional view showing the hole plugging assembly of the present invention has plugged and sealed the hole on the tire.

When the locating bar 59 is displaced to reach at a rear end of the first long slot 57, as shown in FIG. 8, the outer tube 52 is stopped by the locating bar 59 from sliding any further. This means the hole plugging assembly 60 has been fully plugged in the hole on the high-speed tire. At this point, the switch 20 is changed over for the motor 41 to drive the hollow pipe 42 to rotate reversely, so that the pin 63 on the abrasive element 61 is disengaged from the L-shaped open slot 44 on the hollow pipe 42.

Figure 9:
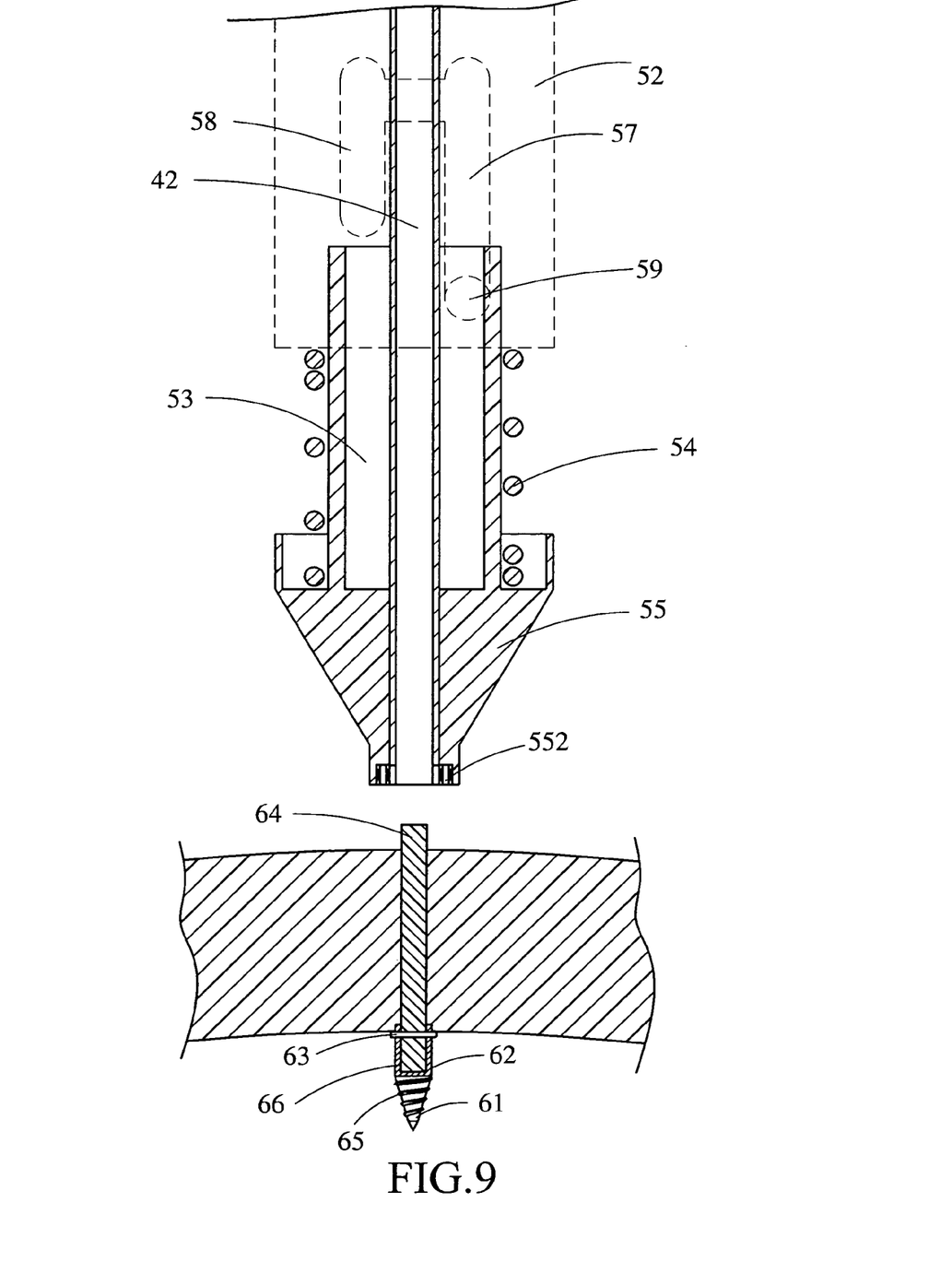
FIG. 9 is a sectional view showing the hole plugging assembly is separated from a head of the tire repair tool.

As shown in FIG. 9, the hollow pipe 42 is driven by the motor 41 to keep turning reversely and finally be moved out of the hole on the tire, leaving the plugging strip 64 in the hole to tightly plug the hole. At this point, the outer tube 52 is pushed backward by a restoring force of the spring 54 to an initial position, and the locating bar 59 is displaced to the front end or the beginning of the first long slot 57 again, and the tire repair is completed.

High-speed tires for different usages may have different tire thickness. For example, a tire for a truck has a tire thickness larger than that of a tire for a passenger car. In the case of repairing the tire of a passenger car, the locating bar 59 may be moved into the second long slot 58 that is shorter than the first long slot 57, so that the outer tube 52 is allowed to slide only within a shorter distance defined by the second long slot 58 for the hole plugging assembly 60 to correctly extend into the hole to a desired depth and properly plug the hole.

The tire repair tool according to the present invention can be effortlessly operated to repair a tire at reduced time, and may be used to accurately repair tires of different tire thickness simply by changing the locating bar 59 to a different long slot to adjust the sliding distance of the outer tube 52, and is therefore practical for use.

What is claimed is:

1. A high-speed tire repair tool for plugging a hole on a tire, comprising:
   a locating unit including an outer tube, a first long slot, and a locating bar; said locating bar being upward extended to partially project from said first long slot;
   a buffer element including a head and an inner tube; said inner tube being connected at a front end to a rear end surface of the head with a rear end of said inner tube rearward projected from said head, and said inner tube being slidably received in said outer tube; said locating bar of said locating unit being fixed at an inner end to said inner tube, such that said outer tube is guided by said inner tube and said locating bar to axially slide toward or away from said head within a predetermined distance;
   a hollow pipe rotatably mounted in said outer tube, said inner tube, and said head; and
   a hole plugging assembly including an abrasive element and a plugging strip; said abrasive element having a front end and a rear end, and said plugging strip having a front end connected to the rear end of said abrasive element; said hole plugging assembly being mounted to said head of said buffer element and connected to a front end of said hollow pipe;
   whereby when a sufficient driving force is provided to rotate and move said hollow pipe forward and slide said outer tube toward said head, said hole plugging assembly is driven into the hole on the tire by said rotating hollow pipe for said abrasive element to trim an inner surface of the hole and said plugging strip to air-tightly plug the hole, preventing air from leaking out of the tire via the hole.

2. The high-speed tire repair tool as claimed in claim 1, wherein said locating unit further includes a second long slot parallel to and communicating with said first long slot, such that said locating bar may be axially displaced in said first or said second long slot.

3. The high-speed tire repair tool as claimed in claim 2, wherein said first long slot is longer than said second long slot, and said predetermined distance within which said outer tube may be slid is defined by a length of said first slot or said second long slot.

4. The high-speed tire repair tool as claimed in claim 1, wherein said buffer element further includes a spring mounted on said inner tube to stretch or be compressed between said head and a front end of said outer tube.

5. The high-speed tire repair tool as claimed in claim 1, wherein said hollow pipe is provided at the front end with an L-shaped open slot, at where said hole plugging assembly is held to said hollow pipe.

6. The high-speed tire repair tool as claimed in claim 1, wherein the front end of said abrasive element is tapered and externally provided with a screw thread, and the rear end of said abrasive element defines a cavity, in which the front end of said plugging strip is inserted.

7. The high-speed tire repair tool as claimed in claim 1, wherein said driving force is applied to said hollow pipe and said outer tube via a driving unit, a switch, and a power-supply element; said driving unit including a motor and being electrically connected to said switch and said power-supply element, and said outer tube and said hollow pipe being connected to said motor; whereby when said switch is turned on, said power-supply element is caused to supply sufficient electric power to said motor, enabling said motor to drive said outer tube to slide and said hollow pipe to rotate while moving axially.

\* \* \* \* \*